(12) United States Patent
White

(10) Patent No.: US 8,641,014 B2
(45) Date of Patent: Feb. 4, 2014

(54) GATE VALVE

(75) Inventor: John M. White, Hayward, CA (US)

(73) Assignee: Applied Materials, Inc., Santa Clara, CA (US)

( * ) Notice: Subject to any disclaimer, the term of this patent is extended or adjusted under 35 U.S.C. 154(b) by 138 days.

(21) Appl. No.: 13/225,871

(22) Filed: Sep. 6, 2011

(65) Prior Publication Data

US 2012/0061605 A1 Mar. 15, 2012

Related U.S. Application Data

(60) Provisional application No. 61/381,719, filed on Sep. 10, 2010.

(51) Int. Cl.
F16K 25/00 (2006.01)

(52) U.S. Cl.
USPC .......................................... 251/175; 251/196

(58) Field of Classification Search
USPC ......... 251/167, 175, 196, 197, 199, 200, 282, 251/326–329; 138/42–46
See application file for complete search history.

(56) References Cited

U.S. PATENT DOCUMENTS

| 4,165,764 | A  | * | 8/1979  | Grandclement | ................ 138/43 |
| 6,517,048 | B2 |   | 2/2003  | Ettinger et al. | |
| 6,561,484 | B2 | * | 5/2003  | Nakagawa et al. | ........... 251/175 |
| 6,817,593 | B2 |   | 11/2004 | Kato et al. | |
| 6,905,107 | B2 |   | 6/2005  | Blahnik | |
| 7,086,638 | B2 |   | 8/2006  | Kurita et al. | |
| 7,234,679 | B2 |   | 6/2007  | Ishigaki | |
| 8,056,882 | B2 |   | 11/2011 | Ohlson et al. | |
| 2008/0017822 | A1 | * | 1/2008 | Schoen et al. | ................ 251/158 |
| 2008/0210307 | A1 | * | 9/2008 | Matsumoto et al. | ........... 137/14 |

* cited by examiner

Primary Examiner — John K Fristoe, Jr.
Assistant Examiner — Hailey K Do
(74) Attorney, Agent, or Firm — Patterson & Sheridan, LLP

(57) ABSTRACT

In one embodiment, a gate valve is provided that includes a seal plate disposed in a housing. An inflatable biasing member is retained on a first side of the seal plate and is positioned to surround a first opening formed through the housing. A ring seal is retained on a second side of the plate opposite the first side and is positioned to surround a second opening formed through the housing. At least one of the inflatable biasing member and the ring seal are adapted to create a vacuum seal around the first and second openings, respectively, when the inflatable biasing member is inflated.

20 Claims, 10 Drawing Sheets

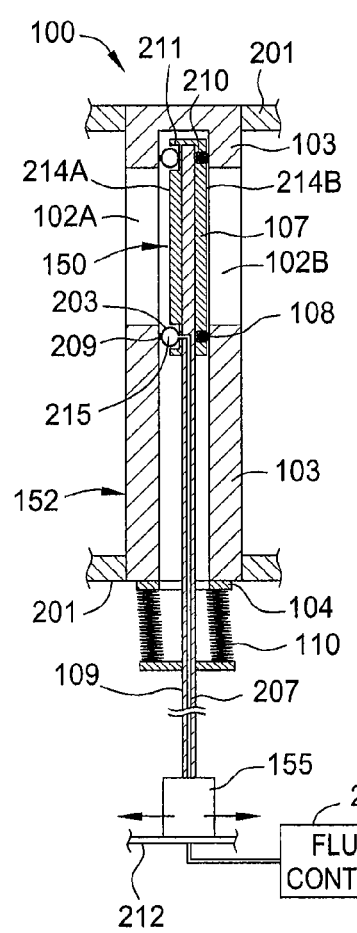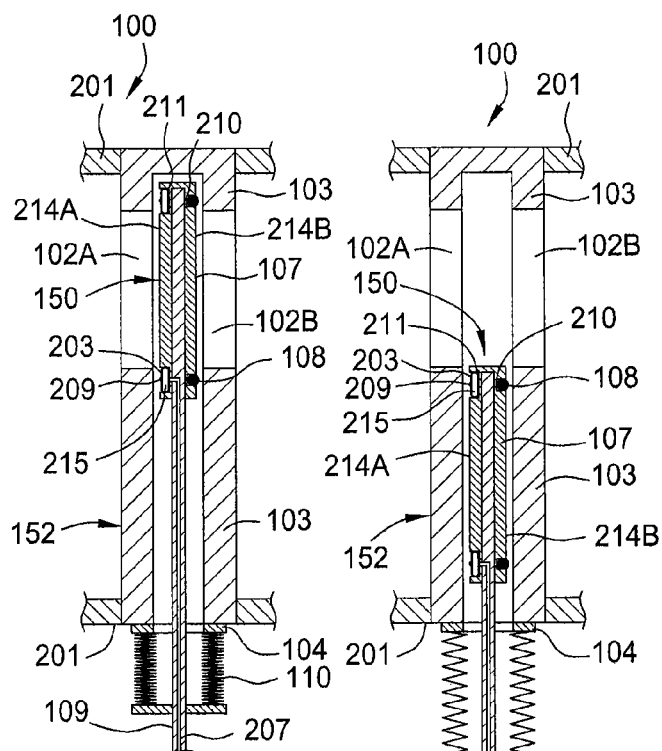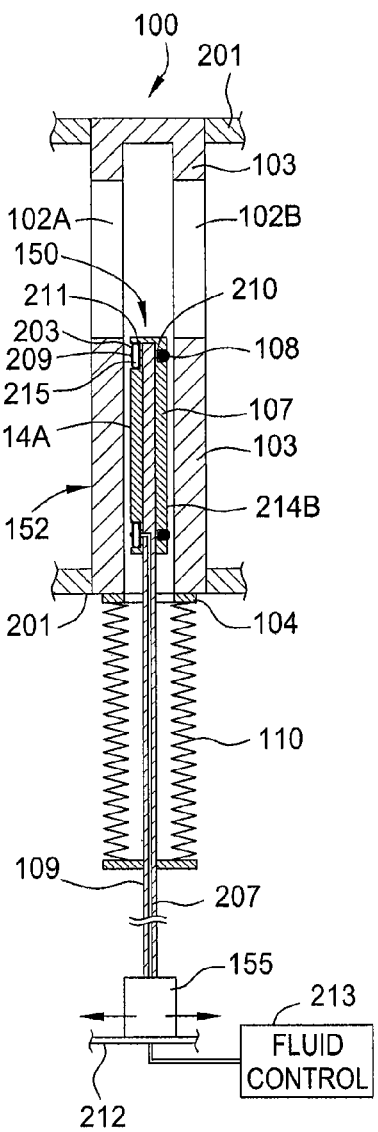
FIG. 2A
FIG. 2B
FIG. 2C

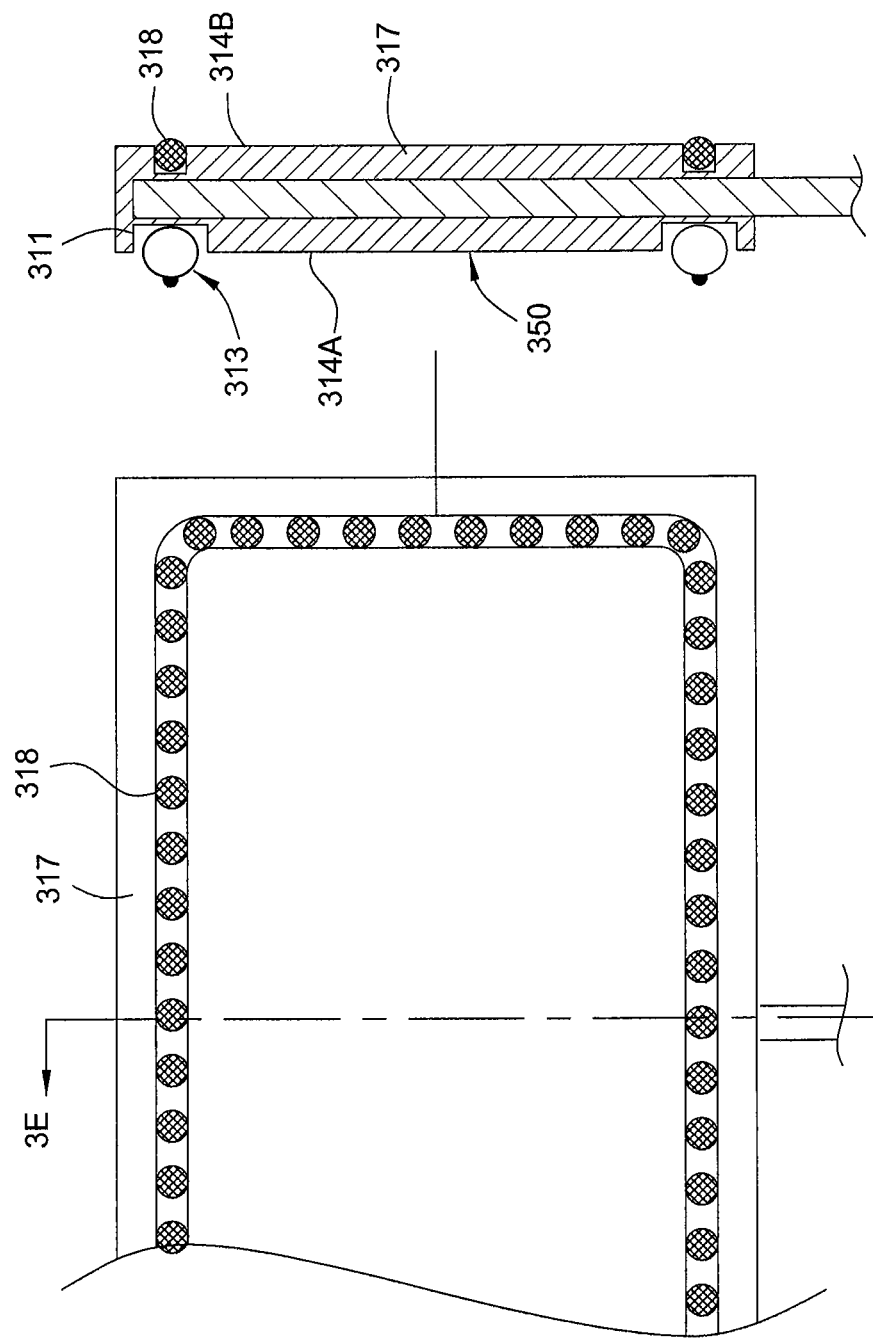

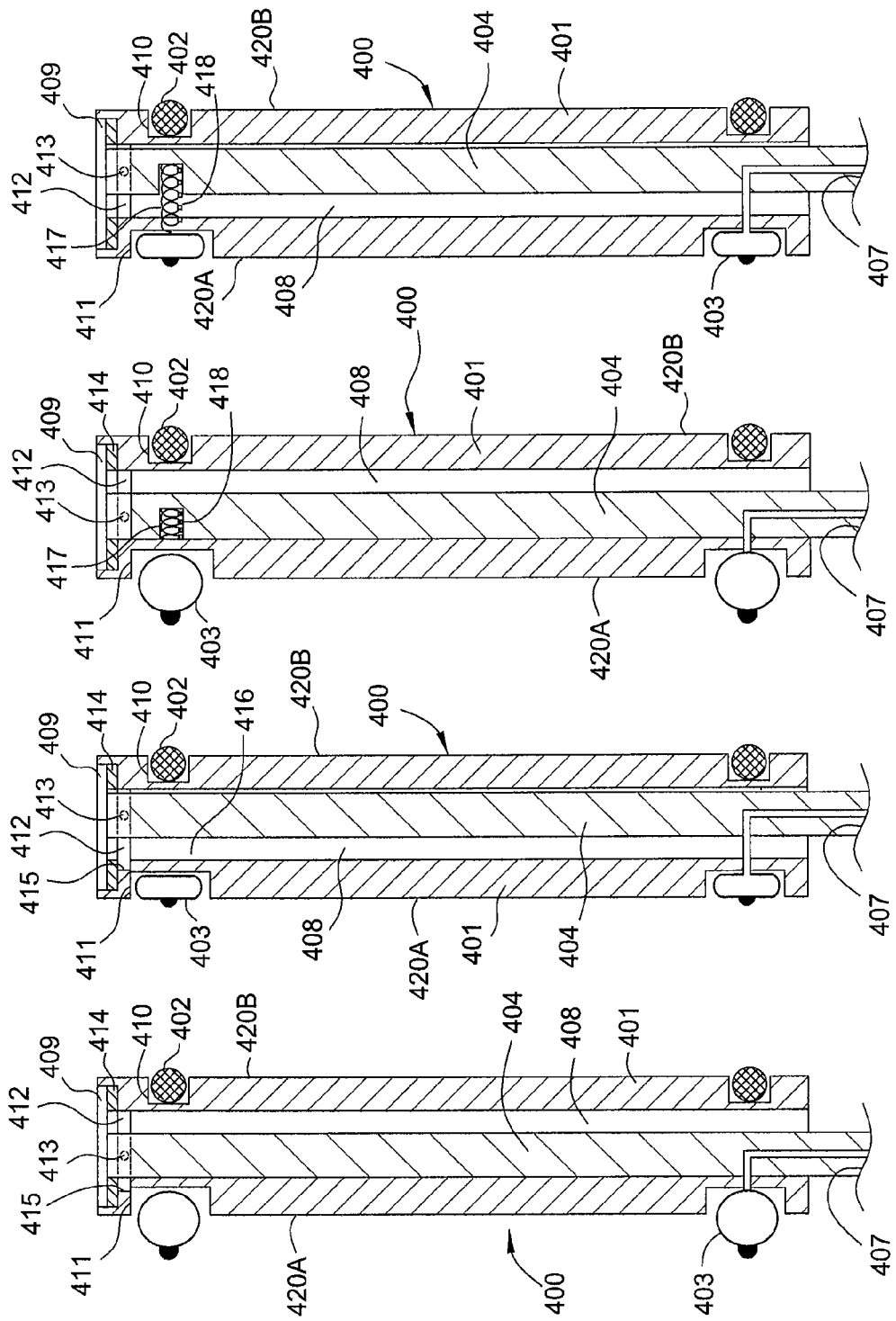

GATE VALVE

CROSS-REFERENCE TO RELATED APPLICATIONS

This application claims benefit of U.S. Provisional Patent Application No. 61/381,719, filed Sep. 10, 2010, which is herein incorporated by reference.

BACKGROUND OF THE INVENTION

1. Field of the Invention

Embodiments of the present invention generally relate to a gate valve, and more specifically to a gate valve having an inflatable seal for sealing the openings between chambers.

2. Description of the Related Art

Gate valves are often used to seal or isolate separate environments in vacuum processing systems. However, conventional gate valve designs are complex, expensive and/or prone to failure if not precisely manufactured and assembled. Additionally, conventional gate valves may further leak if the valve housings do not remain virtually distortion-free during use.

Therefore, there is a need for an improved gate valve.

SUMMARY OF THE INVENTION

Embodiments of the invention generally provide gate valves for isolating chamber environments. The gate valves advantageously include a single seal plate having an inflatable biasing member. Embodiments of the invention find utility in several applications, including chamber to chamber vacuum isolation during semiconductor processing, such as in between a transfer chamber, load lock chambers, and vacuum processing chambers, among other applications.

In one embodiment, a gate valve is provided that includes a seal plate disposed in a housing. An inflatable biasing member is retained on a first side of the seal plate and is positioned to surround a first opening formed through the housing. A ring seal is retained on a second side of the plate opposite the first side and is positioned to surround a second opening formed through the housing. At least one of the inflatable biasing member and the ring seal are adapted to create a vacuum seal around the first and second openings, respectively, when the inflatable biasing member is inflated.

In another embodiment, a gate valve includes a seal plate disposed in a housing and coupled to a plurality of shafts. The shafts are coupled to an actuator operable to selectively position seal plate in front or clear of a first and second openings formed through the housing. An inflatable biasing member is retained on a first side of the seal plate and is positioned to surround the first opening. A ring seal is retained on a second side of the plate opposite the first side and is positioned to surround the second opening formed through the housing. At least one of the inflatable biasing member and the ring seal are adapted to create a vacuum seal around the first and second openings, respectively, when the inflatable biasing member is inflated.

In another embodiment, a gate valve includes a seal plate disposed in a housing. A plurality of shafts couple the seal plate to an actuator operable to selectively position the seal plate in front or clear of a first and second openings formed through the housing. The plurality of shafts are coupled to the seal plate in a manner that allows the seal plate to pivot relative to the shafts. An inflatable biasing member is retained on a first side of the seal plate and is positioned to surround the first opening. A ring seal is retained on a second side of the plate opposite the first side and is positioned to surround the second opening formed through the housing. At least one of the inflatable biasing member and the ring seal are adapted to create a vacuum seal around the first and second openings, respectively, when the inflatable biasing member is inflated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A illustrates a cross-sectional view of the gate valve of FIG. 1B taken along line 2A-2A.

FIG. 2B illustrates a cross-sectional view of the gate valve of FIG. 2A shown in a partially open position.

FIG. 2C illustrates a cross-sectional view of the gate valve of FIG. 1A taken along line 2C-2C.

FIG. 3D illustrates one embodiment of a seal plate having by-pass spacers.

FIG. 3E illustrates a cross-sectional view of the seal plate shown in FIG. 3D taken along line 3E-3E.

FIGS. 4A-D illustrate cross-sectional views of alternative seal plate embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention generally provide gate valves for isolating chamber environments. The gate valves advantageously include a single seal plate having an inflatable biasing member. Embodiments of the invention find utility in several applications, including chamber to chamber vacuum isolation during semiconductor processing, such as in between a transfer chamber, load lock chambers, and vacuum processing chambers, among other applications.

Figure 1A:
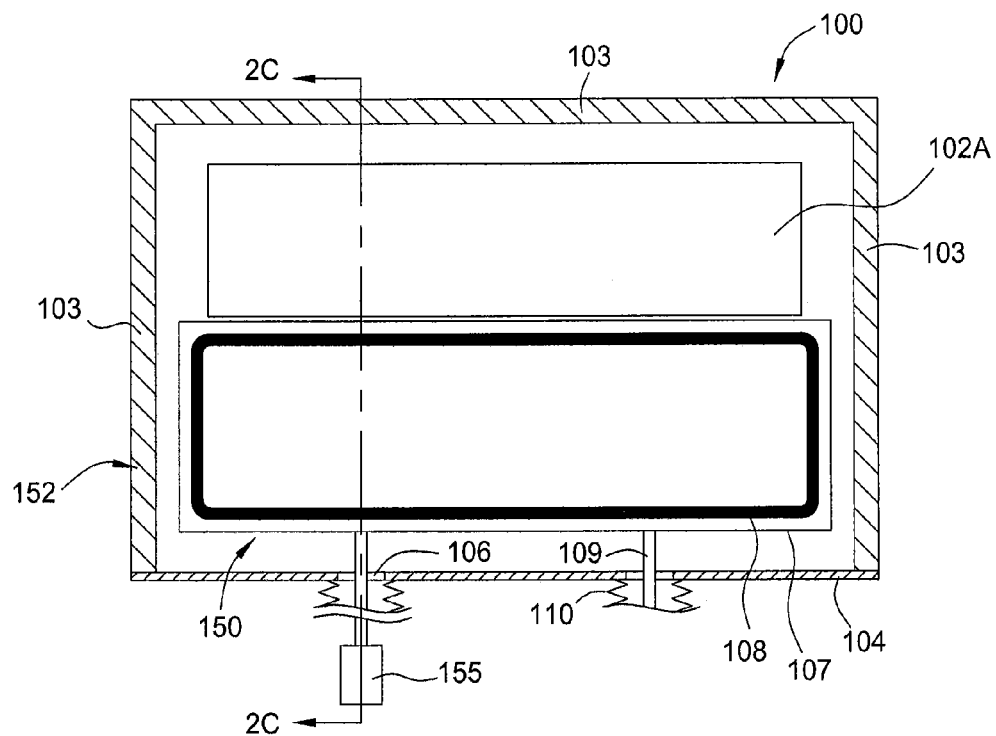
FIG. 1A illustrates a cross-sectional view of one embodiment of a gate valve in an open state.

FIG. 1A illustrates one embodiment of a gate valve 100. The gate valve 100 includes a seal plate 150 disposed in a gate valve housing 152. The housing 152 generally includes housing walls 103, and a lower housing closure 104. A first opening 102A and a second opening 102B (shown in FIG. 2A) are formed through opposing housing walls 103. The openings 102A, 102B are horizontally aligned and sized to allow a substrate disposed on a robot end effector to pass through the housing 152. In one embodiment, the housing 152 has chambers disposed on either side thereof, as represented by chamber walls 201 (shown in FIGS. 2A-C).

Figure 1B:
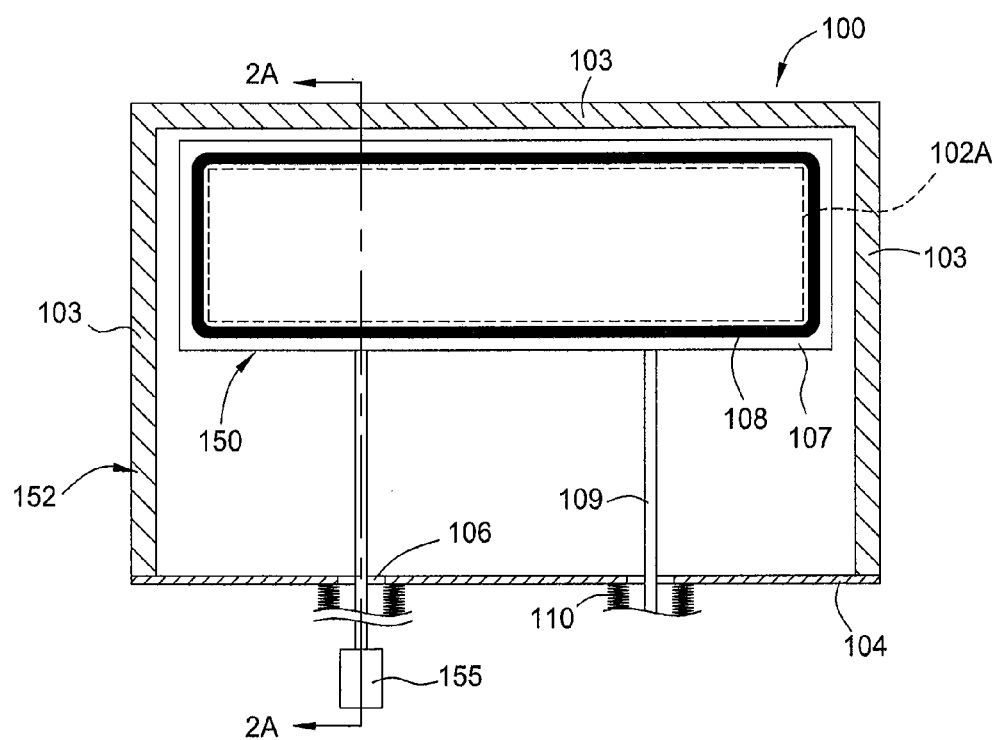
FIG. 1B illustrates a cross-sectional view of the gate valve of FIG. 1A in a closed state.

One or more shafts 109 extend through the lower housing closure 104 and couple the seal plate 150 to one or more actuators 155. The actuator 155 is operable to move the seal plate 150 between a position clear of the first opening 102A, as shown in FIG. 1A, and a position in front and adjacent of the first opening 102A, as shown in FIG. 1B. In one embodiment, the actuator 155 may be supported on a track 212 to allow the actuator 155 to move laterally as the seal plate 150 is displaced laterally during sealing to prevent binding of the shafts.

The lower housing closure 104 is coupled to the housing walls 103 once the seal plate 150 has been positioned within the housing 152. The lower housing closure 104 may further be removable to allow for maintenance and removal of the seal plate 150.

Referring to FIGS. 1A-B and 2A-C, the seal plate 150 generally includes a base plate 107, a ring seal 108, and an inflatable biasing member 203. The base plate 107 may be a single, unitary component, such as a solid plate. The base plate 107 may alternatively be hollow, tubular, C-channel, I-beam, or other geometric configuration. The base plate 107 is made of rigid material, for example a metallic material such as aluminum or stainless steel, among others.

The base plate 107 includes a first side 214A and oppositely facing second side 214B. The first side 214A of the base plate 107 faces the housing wall 103 through which the first opening 102A is formed. The second side 214B of the base plate 107 faces the housing wall 103 through which the second opening 102B is formed. The first side 214A of the base plate 107 includes a groove 211 in which the inflatable biasing member 203 is retained. The second side 214B of the base plate 107 includes a groove 210 in which the ring seal 108 is retained.

The inflatable biasing member 203 is sized and shaped to contact the surface of the housing wall 103 circumscribing the first opening 102A. The inflatable biasing member 203 has a chamber 215 which may be pressurized to expand the inflatable biasing member 203. The expansion of the inflatable biasing member 203 causes the inflatable biasing member 203 to press against the housing 152, thereby causing the base plate 107 to move towards the wall containing the second opening 102B until the ring seal 108 contacts the wall of the housing 152 having the second opening 102B formed therein. The inflatable biasing member 203, along with the portion of the first side 214A of the base plate 107 circumscribed by the inflatable biasing member 203, seals the first opening 102A when the inflatable biasing member 203 is inflated into contact with the housing wall 103 in which the first opening 102A is formed.

The ring seal 108 is sized and shaped to contact the surface of the housing wall 103 circumscribing the second opening 102B. The ring seal 108, along with the portion of the second side 214B of the base plate 107 circumscribed by the ring seal 108, seals the second opening 102B when the seal plate 150 is biased towards the housing wall 103 in which the second opening 102B is formed.

The ring seal 108 and inflatable biasing member 203 may be made of an elastomeric material. In one embodiment, the ring seal 108 and inflatable biasing member 203 are fabricated from KALREZ®, VITON® or other suitable material.

In one embodiment, the gate valve 100 may have two shafts 109 to support the seal plate 150 within the gate valve housing 152. Each shaft 109 may be coupled to the seal plate 150 through shaft openings 106 formed through the lower housing closure 104. The shaft openings 106 are sized to allow lateral movement of the shafts 109, which in turn accommodate the lateral movement of the seal plate 150 as the inflatable biasing member 203 inflates and deflates. Bellows 110 are coupled between each shaft 109 and the lower housing closure 104 to prevent leakage through the shaft openings 106. The bellows 110 may expand and contract during opening and closing of the gate valve 100. The bellows 110 may also accommodate lateral movement of the seal plate 150 within the housing 152 as the seal plate 150 is displaced due to inflation or deflation of the inflatable biasing member 203.

A fluid line 207 is routed through one or more of the shafts 109 to the chamber 215 of the inflatable biasing member 203. A fluid control 213 controls the pressure/flow of fluid passing through the fluid line 207 into and out of the chamber 215. The fluid control 213 may pressurize the chamber 215 to expand the inflatable biasing member 203. The fluid control 213 may also be used to vent and/or pull the fluid out of the chamber 215 to deflate the inflatable biasing member 203. In one embodiment, the fluid control 213 provides clean dry air, nitrogen, or other suitable fluid to the inflatable biasing member 203.

In one embodiment, when the inflatable biasing member 203 is inflated, the inflatable biasing member 203 presses against the housing wall 103 and pushes the seal plate 150 laterally until the ring seal 108 contacts the opposing housing wall 103. The ring seal 108 is compressed, thereby sealing (with the portion of the second side 214B of the base plate 107 circumscribed by the ring seal 108) the second opening 102B formed through the housing 152.

In another embodiment, the inflatable biasing member 203 may include a protruding sealing member 209. Thus, when the inflatable biasing member 203 is inflated, the sealing member 209 is pressed against the portion of the housing wall 103 surrounding the first opening 102A. The sealing member 209 seals (along with the portion of the first side 214A of the base plate 107 circumscribed by the inflatable biasing member 203) the first opening 102A formed through the housing 152.

When the inflatable biasing member 203 is deflated, such as by venting or drawing a vacuum in the chamber 215, the seal plate 150 returns laterally to a central position within the housing 152, as shown in FIG. 2B. Once the inflatable biasing member 203 is deflated, the seal plate 150 may be lowered to a fully open position, as shown in FIGS. 1B and 2C, to allow passage of the substrate through the openings 102A, 102B.

Figure 3A:
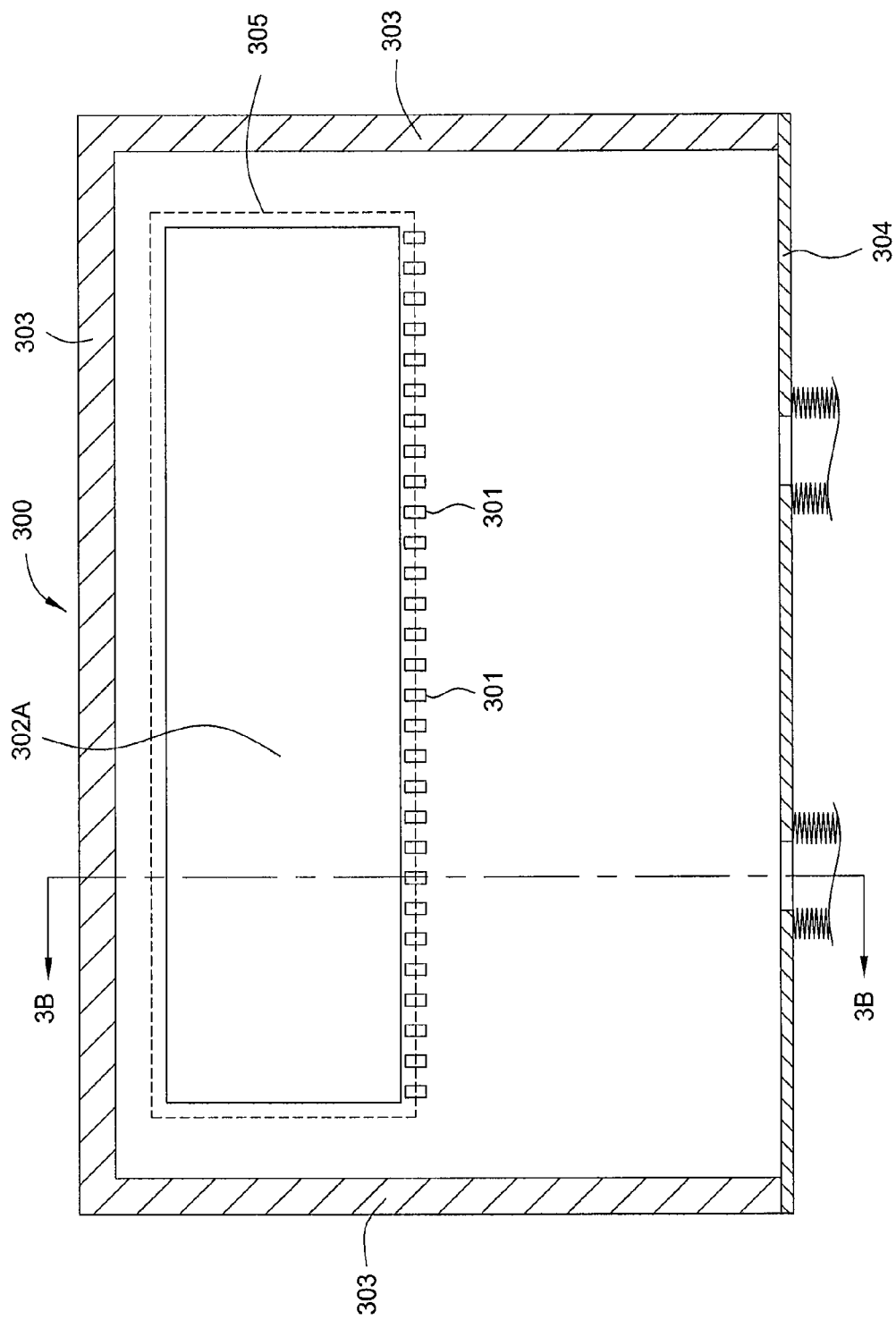
FIG. 3A illustrates a cross-sectional view of one embodiment of a gate valve housing having by-pass grooves.
Figure 3B:
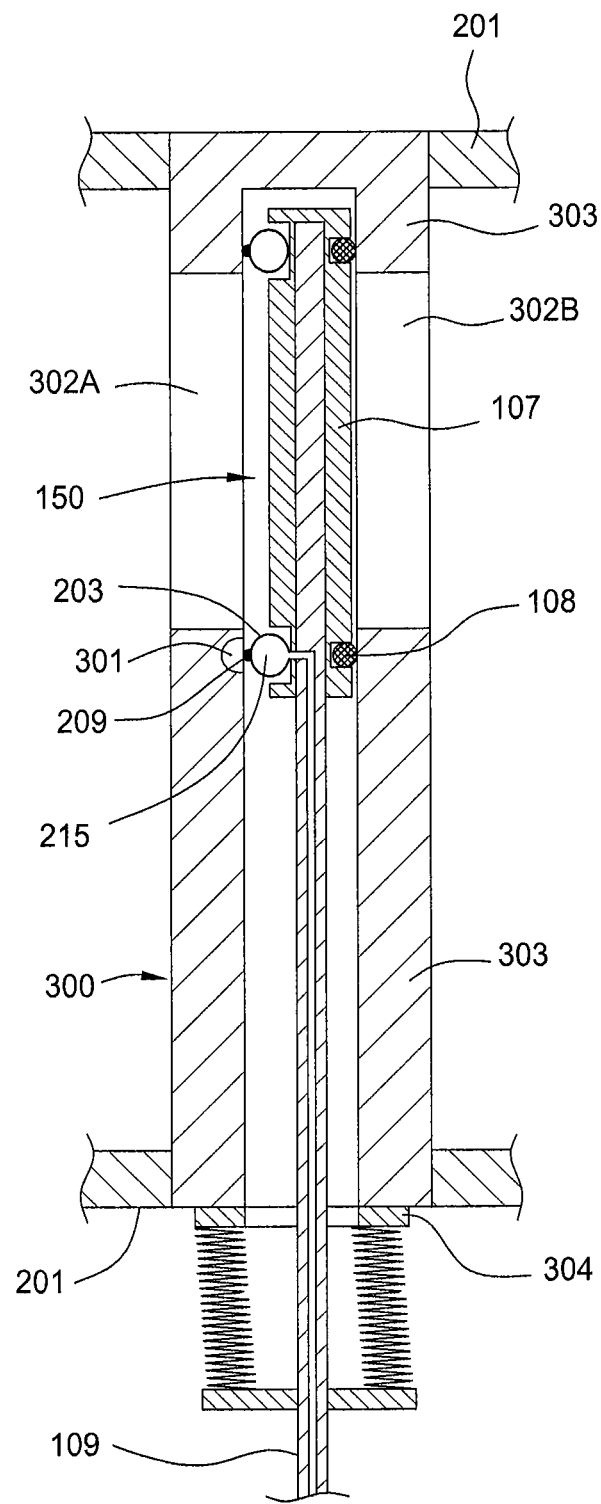
FIG. 3B illustrates a cross-sectional view of the gate valve housing shown in FIG. 3A taken along line 3B-3B and having a seal plate therein.

FIGS. 3A and 3B illustrate a cross-sectional view of one embodiment of a gate valve housing 300 having by-pass grooves 301. The gate valve housing 300 may be generally constructed similar to the gate valve housing 152 described above. The gate valve housing 300 may include a first opening 302A and a second opening 302B, formed through housing walls 303, respectively, on a first and second side thereof. The gate valve housing may further include a lower housing closure 304. One or more by-pass grooves 301 may be formed in one of the housing walls 303 of the gate valve housing 300 adjacent either the first opening 302A or the second opening 302B.

In the embodiment depicted in FIGS. 3A and 3B, by-pass grooves 301 are shown formed in the housing wall 303 through which the first opening 302A is formed. The by-pass grooves 301 are configured to prevent sealing of the first opening 302A by the inflatable biasing member 203 so that the interior of the housing 300 remains in communication with the environment outside the housing 300 (e.g., the adjacent chamber) through the first opening 302A. A dotted line 305 illustrates the location where the protruding sealing member 209 of the inflatable biasing member 203 contacts the housing wall 303 such that by-pass grooves 301 prevent a seal of the first opening 302A from being created by the inflatable biasing member 203. Allowing fluids to by-pass the inflatable biasing member 203 allows the pressure to be equalized between the inside of the gate valve housing 300 and the chamber connected to first opening 302A. Isolation between the environments of the chambers on either side of the gate valve housing 300 is maintained due to the seal created by the ring seal 108.

In an alternative embodiment, by-pass grooves 301 may be formed in the housing wall 303 through which the second opening 302B is formed in the housing wall to allow fluid to by-pass the ring seal 108 while the inflatable biasing member 203 maintains a seal around the first opening 302A.

Figure 3C:
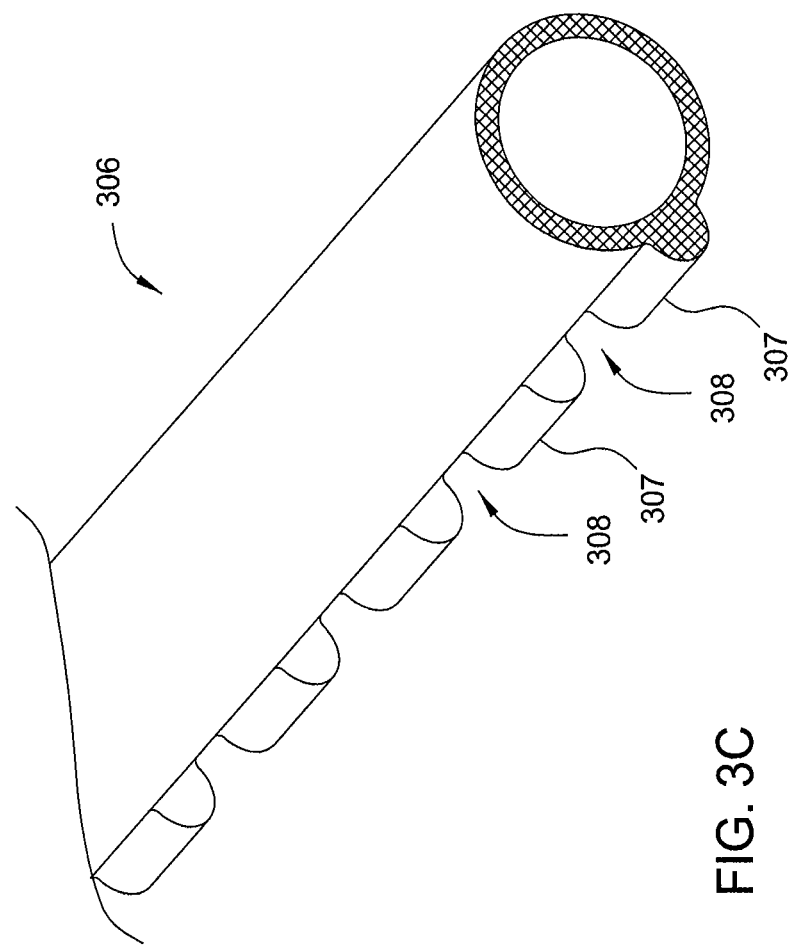
FIG. 3C illustrates a partial cross-sectional perspective view of one embodiment of an inflatable biasing member having by-pass notches.

In another alternative embodiment, an inflatable biasing member 306 may have by-pass notches 308 formed therein, for example in a protruding sealing member 307, as shown in FIG. 3C. The inflatable biasing member 306 may be used in place of the inflatable biasing member 203 shown in FIGS. 2A-C such that the notches 308 allow fluid to by-pass the inflatable biasing member 306 thereby allowing pressure equalization between the inside of the gate valve housing 152 and the chamber connected to first opening 102A. Isolation between the environments of the chambers on either side of the gate valve housing 152 is maintained due to the seal created by the ring seal 108.

Referring to FIGS. 3D and 3E, one embodiment of a seal plate 350 having a plurality of spacers 318 is shown. The seal plate 350 may be similar to the seal plate 150 of FIGS. 2A-C. The seal plate 350 includes a base plate 317 having a groove 311 formed in a first side 314A and a plurality of spacers 318 may be positioned on a second side 314B. Positioned within the groove 311 may be an inflatable biasing member 313 similar to the inflatable biasing member 203 of FIGS. 2A-C. The plurality of spacers 318 project beyond the second side 314B of the seal plate 350 such that when the inflatable biasing member 313 urges the seal plate 350 against the housing 152, the spacers 318 prevent the seal plate 350 from contacting the housing wall 103 of the gate valve housing 152 while the inflatable biasing member 203 seals the first opening 102A. The spacers 318 allow the interior of the housing 152 to be in fluid communication with the chamber connected to the first opening 102A. Isolation between the environments of the chambers on either side of the gate valve housing 152 is maintained due to the seal created by the inflatable biasing member 313. The spacers may be made of an elastomeric material, such as KALREZ®, VITON® or other suitable material.

FIGS. 4A-D and 5A-D illustrate cross-sectional views of alternative gate valve embodiments. Referring to FIGS. 4A-B and 5A-B, one embodiment of a gate valve 550 having seal plate 400 disposed in a gate valve housing 500. The seal plate 400 includes a base plate 401, a ring seal 402 and an inflatable biasing member 403. One or more shafts 404 are coupled to the seal plate 400. At least one of the shafts 404 has an internal fluid line 407 which provides fluid to the inflatable biasing member 403. A shaft hole 408 is formed in the base plate 401 for each shaft 404. The base plate 401 may further have grooves 411, 410 formed in a first side 420A and a second side 420B thereof, respectively. The grooves 410, 411 may be adapted for placement of the ring seal 402 and the inflatable biasing member 403 therein, respectively. The inflatable biasing member 403 may be adapted to seal a first opening 502A of the gate valve housing 500. The ring seal 402 may be adapted to seal a second opening 502B of the gate valve housing 500.

Each shaft hole 408 may be sized to allow the base plate 401 to travel laterally relative to each shaft 404 during opening and closing of the gate valve 550. This allows the one or more shafts 404 to remain in a centralized position within the gate valve housing 500, as shown in FIG. 5A-D, while the inflatable biasing member 403 is inflated or deflated, thereby minimizing binding of the actuators and shafts while the seal plate 400 moves up and down. The seal plate 400 is shown in a raised closed position in FIGS. 4A and 5A and in a lowered open position in FIGS. 4B and 5B.

Figure 6A:
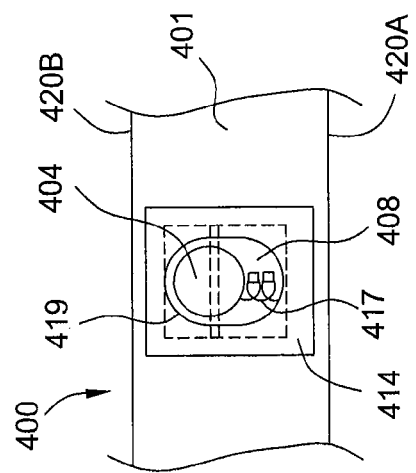
FIGS. 6A and 6B are partial upper perspective views of the seal plates of FIGS. 4B and 4D respectively.
Figure 6B:
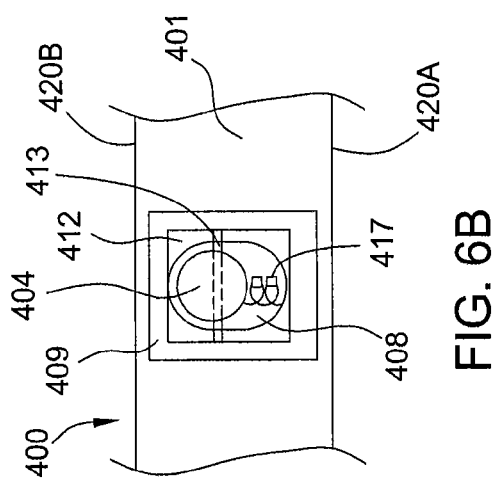
Figure 6C:
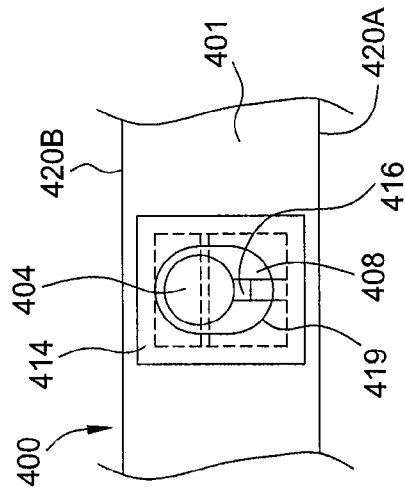
FIG. 6C illustrates one embodiment of a retaining plate.
Figure 6D:
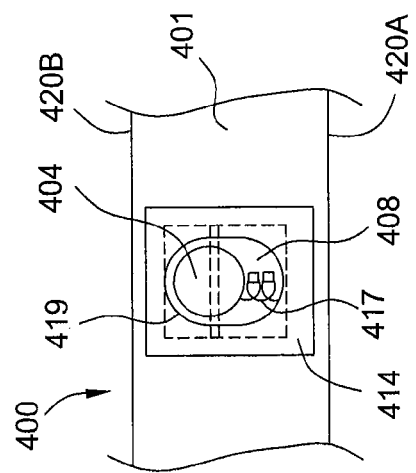
FIGS. 6D and 6E illustrate the partial upper perspective views of FIGS. 6A and 6B, respectively, incorporating the retaining plate of FIG. 6C.
Figure 6E:
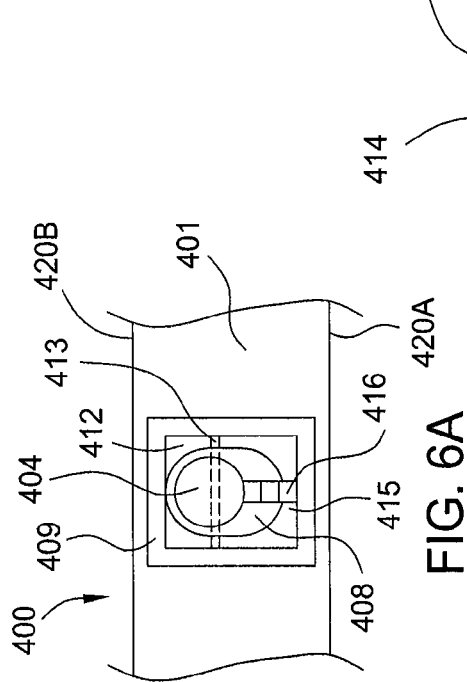

The seal plate 400 may further include an upper groove 409 and a lower groove 412 formed around each shaft hole 408, as seen in FIGS. 4A-B and 6A. A pin 413 extends laterally from an upper end of each shaft 404 and rests on a bottom surface of the lower groove 412. A retaining plate 414, also shown in FIG. 6C, may be coupled within the upper groove 409 and retains the pin 413 within the lower groove 412, as shown in FIG. 6D. The space between a bottom of the retaining plate 414 and a bottom of the lower groove 412 provides clearance that allows the pin 413 to pivot and/or travel laterally along the bottom surface of the lower groove 412. The retaining plate 414 may have a shaft clearance hole 419 to allow the top of the shaft 404 to move freely in a lateral and/or pivotable motion relative to the seal plate 400.

As the seal plate 400 is supported by the pin 413 above a center of gravity of the seal plate, the seal plate 400 hangs in a substantially vertical position when clear of the housing. When the seal plate 400 is biased towards the side wall of the housing 500 by the inflatable biasing member 403, the seal plate 400 is free to pivot on the pin 413 relative to the shaft 404 thereby allowing the seal plate 400 to rotate to a parallel orientation to the side walls of the housing facilitate sealing the openings in the event that the shaft and side walls are not completely parallel.

In another embodiment, the pin 413 slides in the lower groove 412, thus allowing the seal plate 400 to move laterally relative to the shafts 404 as the inflatable biasing member 403 inflates and deflates.

In one embodiment, the lower groove 412 may additionally include a ledge 415 for supporting a flat spring 416. The flat spring 416 may push against the shaft 404 in order to bias the base plate 401 to a more centered position within the housing when the inflatable biasing member 403 is deflated, as shown in FIG. 4B, to allow the seal plate to travel within the housing without binding.

Figures 5A, 5B:
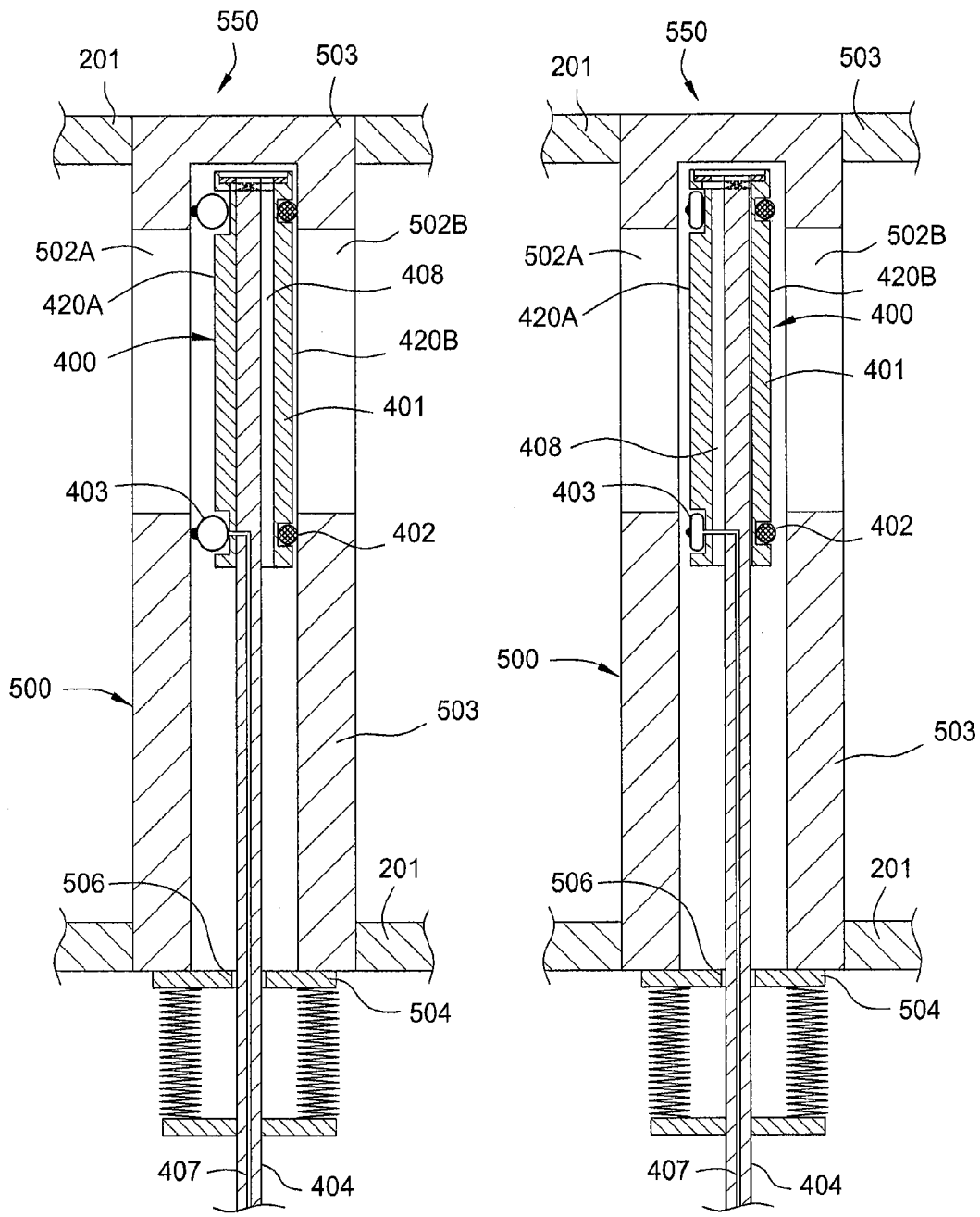
FIGS. 5A-D illustrate cross-sectional views of the seal plates of FIGS. 4A-D, respectively, shown in another embodiment of a gate valve housing.
Figures 5C, 5D:
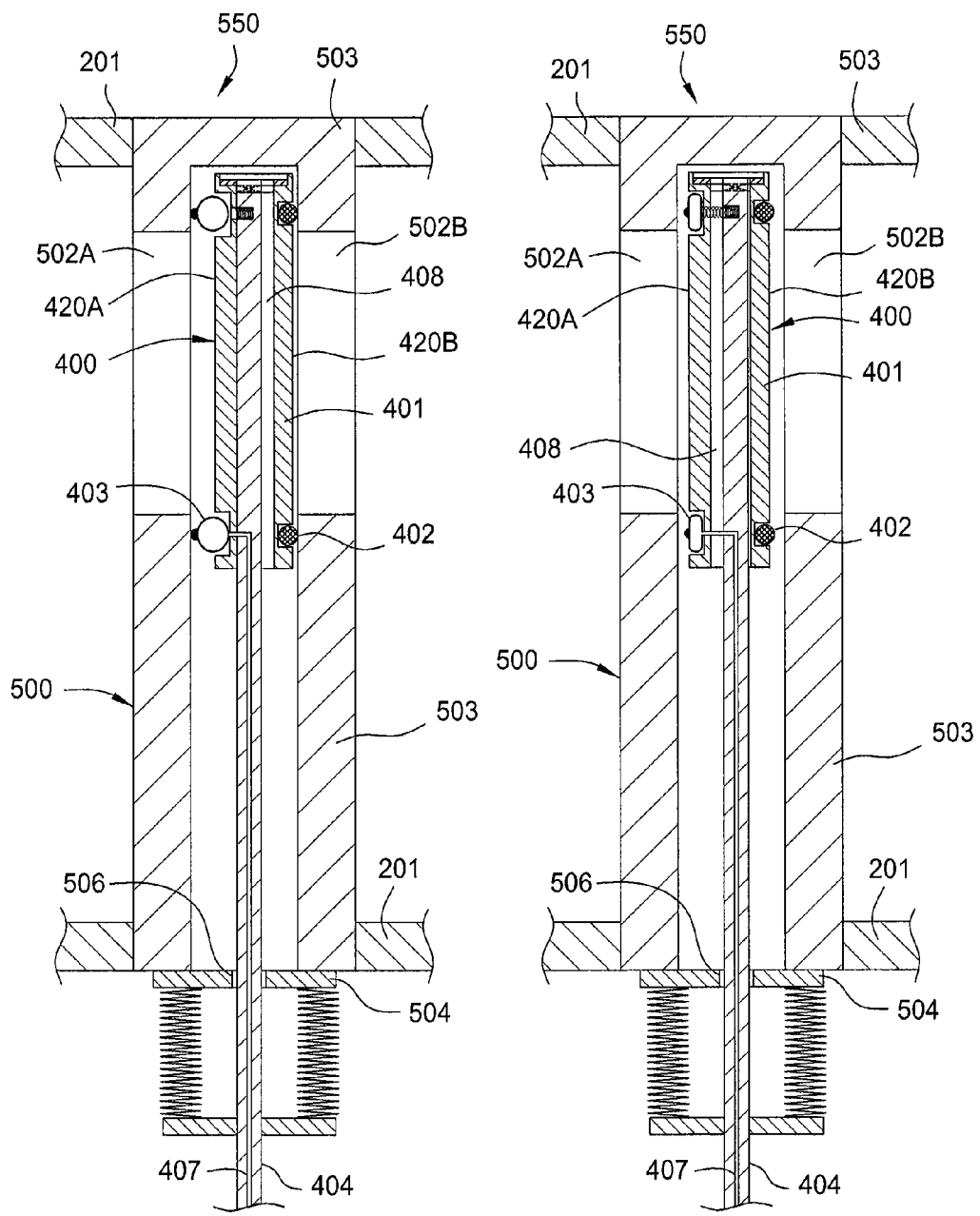

Referring to FIGS. 4C-D, 6B, and 6E, another embodiment of the seal plate 400 incorporates a helical spring 417. The helical spring 417 may be positioned within a spring hole 418 formed into the shaft 404. The helical spring 417 may push against an inner surface of the shaft hole 408 in order to move the base plate 401 to an open position when the inflatable biasing member 403 is deflated, as shown in FIGS. 4D and 5D. The helical spring 417 compresses when the seal plate 400 is in a closed position, as shown in FIGS. 4C and 5C.

Referring to FIGS. 5A-D, the seal plate 400 may be housed in a gate valve housing 500. In one embodiment, the gate valve housing 500 may be of similar construction as the gate valve housing 152 of FIGS. 2A-C. However, the gate valve housing 500 may have walls 503 which are separated a greater distance from each other than the housing walls 103 of the gate valve housing 152 to accommodate the thicker base plate 401 of the seal plate 400. A thicker base plate 401 may be necessitated by the increased size of the shaft holes 408. Further, the gate valve housing 500 may have a lower housing closure 504 having a shaft opening 506 which is similar in diameter to the shafts 404. Since the shafts 404 remain centralized during lateral travel of the seal plate 400, having a shaft opening 506 which is similar in diameter to the shafts 404 may assist in keeping the shafts 404 and seal plate 400 in a substantially vertical position.

Thus, a gate valve has been provided that facilitates chamber to chamber isolation with less costly and simpler construction. Additionally, the reduced complexity of the gate valve construction is less prone to damage and wear, thereby advantageously extending the service interval.

While the foregoing is directed to the preferred embodiments of the present invention, other and further embodiments of the invention may be devised without departing from the basic scope thereof, and the scope thereof is determined by the claims that follow.

What is claimed is:

1. A gate valve, comprising:
   a housing having first and second aligned openings formed therethrough, the openings sized to accommodate robotic transfer of a substrate;
   a base plate disposed in the housing and having a first side and a second side, the base plate movable between positions adjacent and clear of the openings;
   an inflatable biasing member retained on the first side of the plate and sized to surround the first opening, the inflatable biasing member configured to contact the housing when inflated; and
   a ring seal retained on the second side of the plate and sized to surround the second opening, wherein the inflatable biasing member and the ring seal are adapted to create a vacuum seal around the first and the second openings, respectively, when the inflatable biasing member is inflated, and wherein the inflatable biasing member does not extend inwardly of bounds of the first opening and the seal does not extend inwardly of the second opening.

2. The gate valve of claim 1, wherein the housing comprises a plurality of by-pass grooves formed in a wall of the housing.

3. The gate valve of claim 1, wherein the inflatable biasing member comprises by-pass notches protruding from a surface thereof.

4. The gate valve of claim 1, wherein the base plate includes a first groove formed in the first side thereof, and wherein the inflatable biasing member is retained within the first groove.

5. The gate valve of claim 4, wherein the base plate includes a second groove formed in the second side thereof, and wherein the ring seal is retained within second groove.

6. The gate valve of claim 1, further comprising one or more shafts coupled to the base plate.

7. The gate valve of claim 6, further comprising a fluid line disposed through one of the one or more shafts and in fluid communication with the inflatable biasing member.

8. The gate valve of claim 6, wherein each of the one or more shafts extend through an opening formed in a lower housing closure of the housing.

9. The gate valve of claim 8, further comprising bellows disposed between the one or more shafts and each of the openings formed in the lower housing closure.

10. A gate valve, comprising:
    a housing having first and second aligned openings formed therethrough, the openings sized to accommodate robotic transfer of a substrate;
    a base plate disposed in the housing and having a first side and a second side;
    one or more shafts coupled to the base plate;
    one or more actuators coupled to the one or more shafts, the one or more actuators operable to move the base plate between positions adjacent and clear of the openings;
    an inflatable biasing member retained on the first side of the plate and sized to surround the first opening, the inflatable biasing member configured to contact the housing when inflated; and
    a ring seal retained on the second side of the plate and sized to surround the second opening, wherein the inflatable biasing member and the ring seal are adapted to create a vacuum seal around the first and second openings, respectively, when the inflatable biasing member is inflated, and wherein the inflatable biasing member does not extend inwardly of bounds of the first opening and the seal does not extend inwardly of the second opening.

11. The gate valve of claim 10, wherein the base plate includes a first groove formed in the first side thereof, and wherein the inflatable biasing member is retained within the first groove.

12. The gate valve of claim 11, wherein the base plate includes a second groove formed in the second side thereof, and wherein the ring seal is retained within second groove.

13. The gate valve of claim 12, wherein the inflatable biasing member comprises by-pass notches protruding from a surface thereof.

14. The gate valve of claim 12, wherein the housing comprises a plurality of by-pass grooves formed in a wall of the housing.

15. The gate valve of claim 12, wherein the one or more shafts is two shafts.

16. The gate valve of claim 15, further comprising a fluid line disposed through one of the two shafts and in fluid communication with the inflatable biasing member.

17. A gate valve, comprising:
    a housing having first and second aligned openings formed therethrough, the openings sized to accommodate robotic transfer of a substrate;
    a base plate disposed in the housing and having a first side and a second side, the base plate movable between positions adjacent and clear of the openings;
    one or more shafts pivotably coupled to the base plate;
    an inflatable biasing member retained on the first side of the base plate and sized to surround the first opening, the inflatable biasing member configured to contact the housing when inflated; and
    a ring seal retained on the second side of the base plate and sized to surround the second opening, wherein the inflatable biasing member and the ring seal are adapted to create a vacuum seal around the first and second openings, respectively, when the inflatable biasing member is inflated, and wherein the inflatable biasing member does not extend inwardly of bounds of the first opening and the seal does not extend inwardly of the second opening.

18. The gate valve of claim 17, further comprising a fluid line disposed through one shafts and in fluid communication with the inflatable biasing member.

19. The gate valve of claim 17, wherein the one or more shafts are two shafts, and wherein the housing comprises a third opening and fourth opening through which the two shafts are disposed.

20. The gate valve of claim 19, further comprising a first set of bellows disposed around one of the two shafts and the third opening, and a second set of bellows disposed around the other of the two shafts and the fourth opening.

* * * * *